Jan. 9, 1945.　　　　　O. S. PETTY　　　　2,367,049
AUTOMATIC VOLUME CONTROL FOR RECORDER AMPLIFIERS
Filed Feb. 15, 1940　　　2 Sheets-Sheet 1
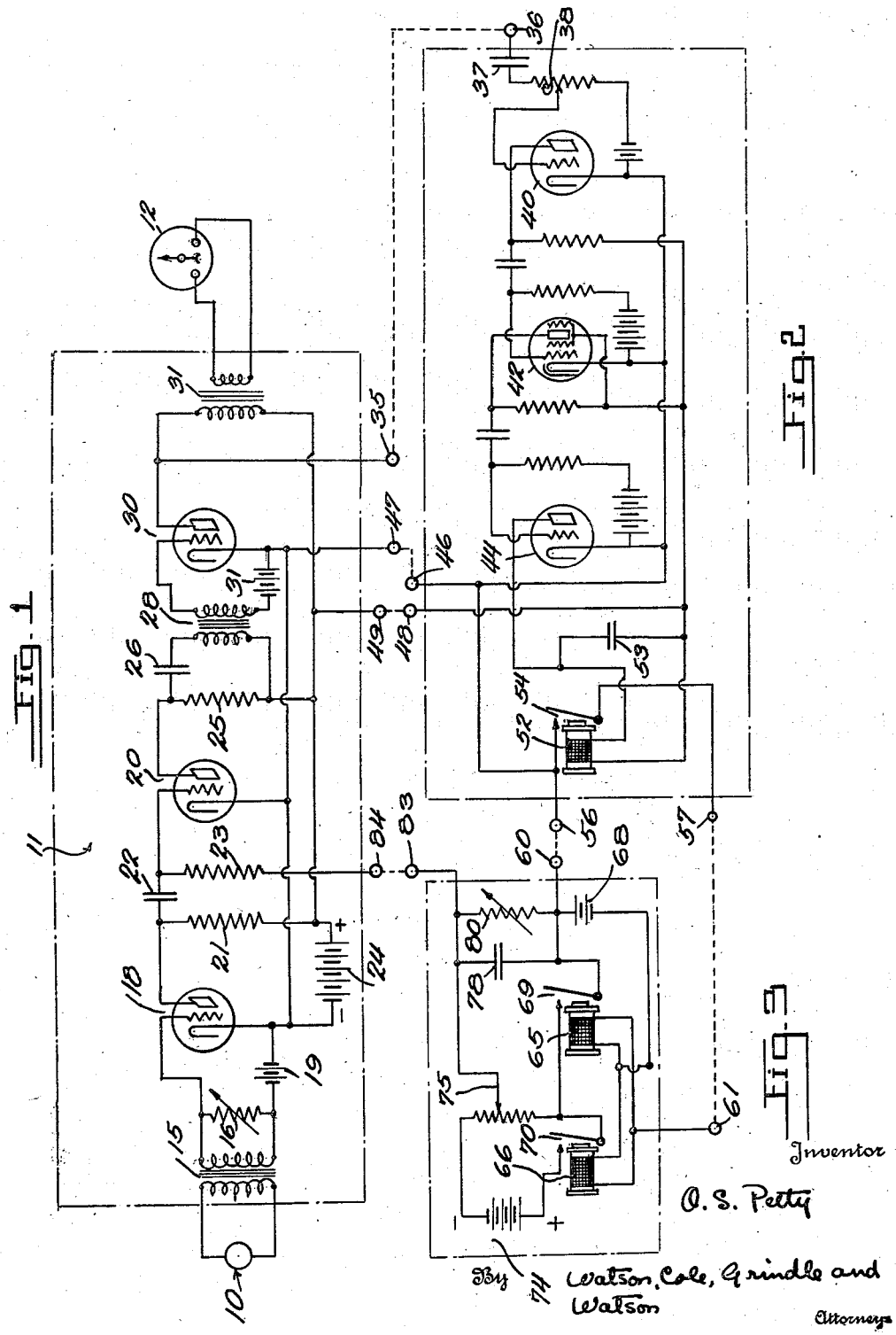
Inventor
O. S. Petty
By Watson, Cole, Grindle and Watson
Attorneys Jan. 9, 1945.  O. S. PETTY  2,367,049
AUTOMATIC VOLUME CONTROL FOR RECORDER AMPLIFIERS
Filed Feb. 15, 1940   2 Sheets-Sheet 2

Inventor
O. S. Petty
By Watson, Cole, Grindle & Watson
Attorneys

Patented Jan. 9, 1945

2,367,049

UNITED STATES PATENT OFFICE 2,367,049

AUTOMATIC VOLUME CONTROL FOR RECORDER AMPLIFIERS

Olive S. Petty, San Antonio, Tex.

Application February 15, 1940, Serial No. 319,137

2 Claims. (Cl. 177—352)

This invention relates to methods of and apparatus for seismic surveying, and deals particularly with the treatment of the received shock waves after their conversion to electrical equivalents, whereby a recorded chart may be made in which the maximum amplitude swings throughout the length of the chart are generally maintained below a predetermined level, while weaker portions of the waves are amplified to usable levels.

It has heretofore been known that reasonably accurate mapping of geological formations can be effected by creating seismic waves at a point or points near the earth's surface and determining at one or more points remote therefrom the lapse of time required to enable the waves to reach such remote points. The customary procedure in such surveying is to fire a charge of explosive at a suitable distance on or at a suitable distance below the surface of the earth at a position commonly referred to as a "shot point," and to detect or receive the resulting primary and reflected seismic waves at remote points where they are converted into electrical energy of varying voltage. Suitable apparatus is then employed to record the fluctuations of this electrical energy in permanent form for study.

In general, the instant invention is concerned with two types of seismic waves which reach any receiving or detecting point, and while others are known, these two are adequate for the consideration of the invention. The first of these are predominantly "primary" waves of higher energy content whose passage is through the upper stratum or strata of the earth, probably those just below the weathered layer. These waves are of considerable intensity because of their relatively short and direct paths of travel, while the second type of wave, hereinafter referred to as "reflected," is of much less intensity since it represents the reflection of a primary wave from a horizon or interface of two different strata beneath the earth's surface. Not only is the path materially longer to any one of these horizons and back to the receiving point, but there is a considerable attenuation in the waves in passing through the different strata. Actually, only a very small percentage of the energy in a wave is reflected back—most of it is refracted and continues on to greater depths. Consequently, those waves reflected from the horizons closest to the surface are naturally of much greater intensity than those from more remote horizons. The time of travel of the reflected and refracted waves is not solely dependent upon the distance but may be influenced by the type of material through which the waves pass and the percentage of energy reflected.

As a result of the conditions outlined above and other complex phenomena, it is well recognized that the earlier higher energy waves are received with an intensity of the order of 600 times as great as the remainder of the trace and they normally reach the reception point in toto before any of the desired reflected waves. Furthermore, the intensity of the reflected waves decreases rather uniformly with time since the later a wave is received the longer its path and the greater its attenuation, with few exceptions.

In order that waves of the various types may all be received and recorded by sensitive apparatus on a record sheet or other medium of convenient dimensions, it is highly essential that some means be provided to bring the waves, or the energy derived therefrom, to levels not greatly differing throughout the total time of wave reception.

Conventional equipment for recording the seismic waves includes at the receiving point a device variously called detector, seismograph, seismometer, geophone, or the like. Such an instrument may take as many forms as it has names, and in general comprises a relatively steady mass and a part movable with the earth, these parts supporting electrical elements relatively movable thereby, whereby electric voltages are generated or varied in accordance with variation in the strengths of the respective energizing waves. The electrical output from such a geophone is customarily amplified with suitable equipment and fed into a recorder which includes a galvanometer having a moving element whose motion, by suitable optical means, is recorded on a photographic sheet caused to move by clockwork at a substantially fixed rate and also to have recorded thereon definite time intervals from an appropriate timer.

In order to make use of the records made, as described above, it is primarily essential to know various time intervals and accurate record is made on the chart of the time of the shot or explosion as well as a trace of the received and converted vibrations. The time from the shot to the peak of any vibration may then be ascertained by counting the time interval marks between it and the indication of the explosion. The output of a seismometer is relatively feeble and it is customary to amplify the voltage waves as previously mentioned before applying them to the recorder. Such amplification must be adequate to lift the general level of the most feeble waves near the end of the chart to a usable size but the same amount of gain would cause the earlier higher energy waves to be so disproportionately large that their traces would extend beyond the chart and the intensity of energy delivered to the recorder might wreck the sensitive galvanometer.

It is therefore the purpose of the present invention to provide methods of and means for so leveling out the trace on the chart that the general average level throughout its length is of such size as to be both usable and within the confines of the chart. To this end it is proposed, in accordance with the instant invention, to so alter the amplitude of energy received from or representative of the waves at the remote point or points that the average level of the record is maintained fairly uniform throughout.

In my prior application Serial No. 290,929, filed August 18, 1939, I have described a method of achieving the desired general uniformity in amplitude of the recorded signal by varying the sensitivity of the recording device. Thus in the preferred form of the invention illustrated in my prior application, a string galvanometer is employed in connection with an optical system to effect a record of the electrical energy to which the incoming waves or signals are converted, and the field of the galvanometer is controlled so as to produce a usable record. By means of the present invention it is intended to control the record to produce generally similar results, but in its more specific aspect the invention contemplates the application of control at some point other than the recording device, for example by changing the amplitude of the electrical energy derived from the received signals.

More specifically, it is an object of the present invention to provide means for controlling the general amplitude level of electrical wave-form energy by automatically controlling the degree of amplification of such waves.

It is a further object of the invention to provide apparatus for recording seismic waves including a detector, a recording device, and an intermediate amplifier, together with means whereby the amplification effected by the amplifier is automatically varied in response to the reception of a signal in excess of a predetermined amplitude. In the preferred form of the invention the degree of amplification of the received signal is decreased when a signal of predetermined strength is received, such as the earlier or "primary" waves, and is thereafter gradually increased during the continued reception of signals to compensate for gradual attenuation of the later received waves.

A further object of the invention is the provision of means responsive to a received signal for gradually increasing the energy level in respect to time to maintain a generally uniform level throughout the period of reception of signals.

Still a further object is to provide means responsive to a received signal to effect material reduction of the amplitude of the recorded waveform energy, to maintain the record of the earlier received waves within usable limits.

Further objects and features of the invention will be apparent from the following description, taken in connection with the accompanying drawings, in which Figure 1 is the wiring diagram of the essential elements of a system for the reception and recording of seismic waves;

Figure 2 represents an amplifying relay circuit operable by signals received and amplified in the circuit shown in Figure 1;

Figure 3 represents a circuit for regulating the operation of the circuit shown in Figure 1 in response to operation of the relay shown in Figure 2.

Figure 3A:
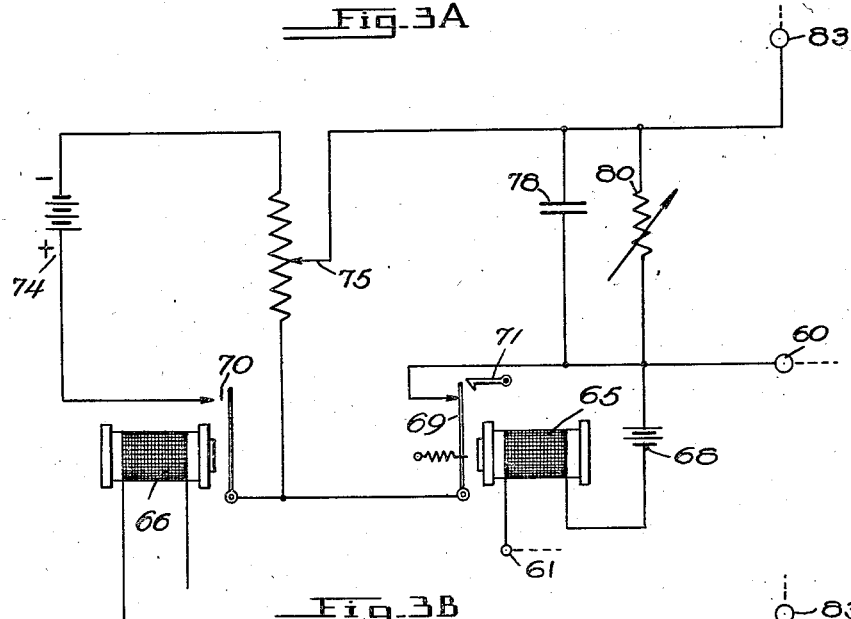
Figures 3a and 3b are diagrams representating slightly modified forms of the circuit shown in Figure 3.

In order to facilitate an understanding of the invention, one embodiment thereof has been shown in the accompanying drawings and specific language is employed to describe the same. It will nevertheless be understood that no limitation of the invention is thereby intended, and that various modifications and alterations of the illustrated and described structure are contemplated such as fall within the scope of the claims appended hereto.

The complete circuit shown in the drawings has been represented in three separate figures. This has been done not only to facilitate an understanding of the relationship between the several parts of the system, but also because in practice it is convenient to divide the complete system into three separate types of unit. Thus Figure 1 discloses an arrangement which is largely conventional for detecting or receiving the seismic impulses and converting them into electrical energy, amplifying this energy, and applying the amplified energy to a conventional recording device. Since the signal is usually received or detected at a plurality of spaced points, in order that the time of arrival of the signal at different points may be observed, it is customary to provide a separate unit for the reception, amplification, and recording of signals arriving at each of these points, for example, eight or ten. On the contrary, only one unit embodying the circuit shown in Figure 2 need ordinarily be supplied, since in general the amplitude level of signals arriving at the different detecting or receiving stations is of the same order at any given instant, providing these stations are not too widely spaced, and it is thus necessary to feed energy from only one of the units of the type shown in Figure 1 to a single unit of the type shown in Figure 2. Since, however, control of the characteristics of each of the units shown in Figure 1 should be effected separately in order to reduce coupling between the units, the number of circuits of the type shown in Figure 3 employed is the same as the number of circuits shown in Figure 1, each of the seismic amplifiers being supplied with gain control energy from a separate control circuit.

Dealing now in detail with the several figures, Figure 1 shows diagrammatically a complete seismic unit including a detector or seismometer 10, an amplifier indicated generally at 11, and a galvanometer or other recording device 12. The detector or seismometer 10 may be constructed in any conventional manner so as to generate a pulsating current upon relative displacement of a suspended mass and the casing in which the mass is supported. The pulsating current so generated may be delivered to the primary winding of a transformer 15, the secondary being shunted by variable resistor 16 which may be adjusted to control the general amplitude level of the signal applied to the amplifier. The output of the transformer 15 is impressed upon the grid circuit of a thermionic valve 18, a suitable grid bias voltage being supplied from a source 19. The valve or tube 18 is resistance-coupled to a second valve 20 through plate resistor 21 and condenser 22, plate voltage being supplied from the source 24. Grid resistor 23 is supplied with a grid bias from the control circuit shown in Figure 3, hereinafter more fully described. The output of valve 20 is coupled by means of plate resistor 25 and condenser 26 to the primary of a transformer 28, the secondary of this transformer delivering energy to the grid circuit of valve 30, a suitable source of grid bias voltage being supplied. The output of valve 30 is coupled by means of a transformer 31 to the input terminals of the recording device 12.

Recording device 12 is represented in the drawings by the conventional symbol for galvanometers. In practice, since a plurality of seismic detectors and amplifiers are employed and a comparison of the signals received by these various units is essential to a study of geological formations, a multiple string galvanometer is commonly used, each string being energized by the signal from the output of one seismic amplifier. By a suitable optical system the deflections of the strings are permanently recorded on a photographic sheet.

It will be appreciated that the details of the equipment thus far described form no essential part of the invention except to the extent that they enter into combination with the control of equipment hereinafter discussed for regulating the sensitivity of the system. Various types of detectors or seismometers and recording equipment may be employed, and the seismic amplifier may vary widely from that illustrated herein.

Turning now to the circuit illustrated in Figure 2, it will be observed that part of the signal energy received by the detector 10 is delivered after suitable amplification to a further amplifier and relay. Energy for this purpose may be derived from any part of the system shown in Figure 1, but is preferably taken from the plate circuit of the valve 30. Thus by coupling the terminals 35 and 36, a portion of the signal energy may be conducted from the plate of valve 30 through a condenser 37 and a potentiometer 38 to the grid of a thermionic valve 40. The output of valve 40 is further amplified in the circuits of valves 42 and 44, conventional resistance-coupling being employed between these valves similar to that described more particularly in connection with Figure 1. The cathodes of valves 40, 42, and 44 are preferably coupled with the cathodes of valves 18, 20, and 30 of the seismic amplifier by connecting the terminals 46 and 47. Plate voltage may be supplied to the valves 40, 42, and 44 from the source 24 by coupling terminals 48 and 49, or a separate source may be employed.

Relay 52 is introduced in the plate circuit of valve 44, the relay winding being shunted by condenser 53 to improve the action. Energization of relay 52 closes switch 54 to afford a conducting path between terminals 56 and 57.

The characteristics of the circuit shown in Figure 2 are such that by suitable adjustment of the potentiometer 38, relay 52 will be operated when the input to the circuit, representative of the output of the seismic amplifier and therefore of the amplitude of the seismic disturbance, exceeds a predetermined amount. In practice it is usually desired to so adjust the constants of the circuit that the relay will be operated on the reception by the detector 10 of the first of the series of strong impulses which are characteristic of the so-called "primary" waves, in order that the degree of amplification of these waves may be substantially reduced and the record of the same maintained within usable limits.

The terminals 56 and 57 of the relay control amplifier of Figure 2 are coupled, respectively, with terminals 60 and 61 of each of a series of control units, one of which is shown in Figure 3. Each such unit preferably includes two relays 65 and 66, the windings of which are connected in parallel in a circuit containing an electrical source 68, which may be the source employed for supplying current to the heater elements of the various valves in the circuits shown in Figures 1 and 2. It will be observed that when the switch 54 of the circuit shown in Figure 2 is energized, the windings of relays 65 and 66 will be energized by the source 68 to close switches 69 and 70, respectively. These switches are arranged in series in a circuit which includes the electrical source 74, the voltage delivered by this source being adjusted by means of a potentiometer 75. The sole function of switch 70 is to normally open the circuit adjacent the source 74 to prevent the draining of current from the source 74 through the potentiometer 75. When switches 69 and 70 are both closed on energization of relay 52, a potential determined by the setting of potentiometer 75 is applied to the plates of condenser 78. A variable resistor 80, connected in shunt with the condenser 78, controls the rate at which the charge is drained from the condenser. One plate of condenser 78 is coupled through terminals 83 and 84 and through grid resistor 23 to the grid element of valve 20, the other plate of condenser 78 being coupled through terminals 60 and 56 and terminals 46 and 47 to the cathode of valve 20. Thus the charge on condenser 78 may be utilized for supplying a grid bias to the valve 20 and thereby regulating the operating characteristics of the valve and the gain of the seismic amplifier.

The mode of operation of the apparatus will now be apparent. As hereinbefore described, operation of the control supply circuit shown in Figure 3 is initiated on the reception by the detector 10 of the earlier received "primary" seismic waves of high amplitude. The condenser 78 is thereupon charged from the source 74 by the closing of switches 69 and 70 to apply a negative bias to the grid of valve 20 which is sufficient to reduce the plate current of that tube to a very low value. The negative bias thus applied is initially controlled by setting the potentiometer 75 so as to maintain the gain of the seismic amplifier relatively low during the reception of the "primary" waves, so that they may be conveniently recorded. As soon as the output of the seismic amplifier falls below the value required for the energization of the relay 52, the switches 69 and 70 will open, and the voltage derived from the source 74 is eliminated. The grid bias of the valve 20 is then determined solely by the charge on the condenser 78, and the variable resistor 80 is so initially set as to permit this charge to leak off the condenser 78 at a predetermined rate in respect to time. In practice this rate of discharge of the condenser 78 is so selected that the gradual reduction of negative bias on the valve 20 affords adequate compensation for the gradual attenuation of the later received reflected waves, as hereinbefore explained, the gain of the seismic amplifier gradually increasing as the amplitude level of the received signals decreases.

Figure 3a represents a slightly modified form of the circuit shown in Figure 3. Since similar elements are employed, the same reference numerals are used for convenience to describe them.

Thus, it will be observed that the arrangement shown in Figure 3a is identical with that of Figure 3 except that the switch 69 is normally closed rather than normally open, and it is intended that the relay 66 shall be manually rather than automatically operated. For example, the relay 66 may be energized from the source which supplies heating current to the thermionic valves of the system, so that switch 70 is closed by energization of relay 66 so long as current is supplied to the valve heaters.

Thus, when the system is placed in operation by manipulation of the conventional control switch for the heater current, switch 70 is closed, and the voltage of source 74, adjusted by potentiometer 75, is applied to the condenser 78. Condenser 78 is thus fully charged at the desired potential before the primary waves arrive, and this potential is applied to the grid of thermionic valve 20 (shown in Figure 1) through the terminals 83 and 60 of Figure 3a. Operation of the relay 65 by the energy derived from the primary waves, in the manner hereinbefore described, opens switch 69 to disconnect source 74 from condenser 78, and thereafter the switch 69 is retained in the open position, for example, by a detent 71, until manually reset to the closed position. After the reception of the initial primary wave energy, the grid of valve 20 is therefore biased solely by the charge on condenser 78, which is gradually dissipated through the variable resistance 80 as hereinbefore explained, so as to effect gradual increase of the degree of amplification of the received signal, and thereby to compensate for attenuation of later received signals.

Figure 3B:
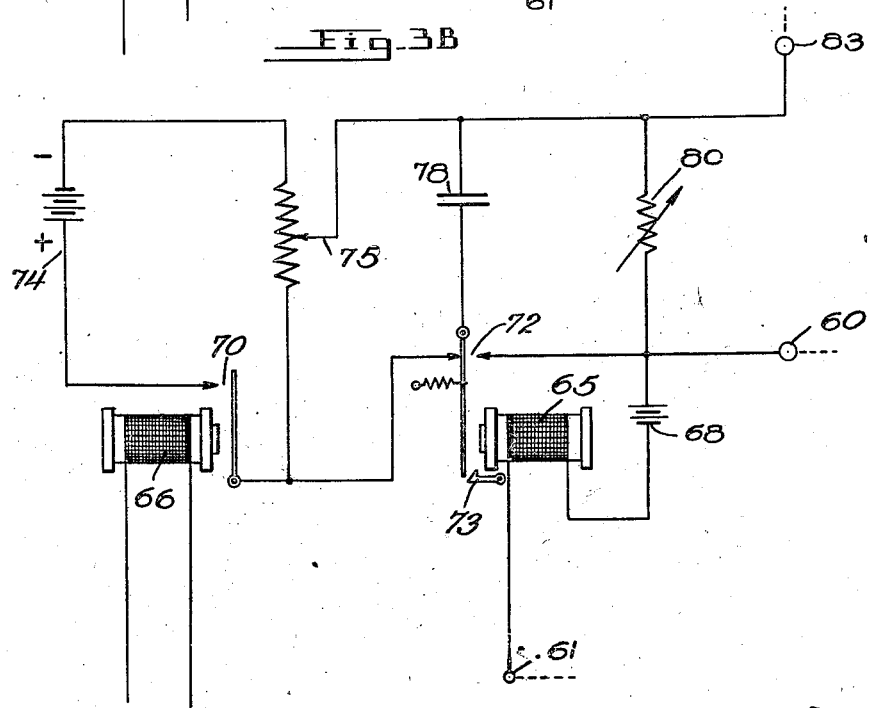

Figure 3b illustrates a further modification in which switch 70 is arranged for operation in the manner described with reference to Figure 3a, switch 69 being replaced by a double-throw single-pole switch 72, arranged for retention in one position by detent 73, but initially occupying the other position in which it is shown in the drawings.

When the system is placed in operation, condenser 78 is charged from source 74 through switch 72, but no charge is then applied by condenser 78 to the grid of valve 20 of Figure 1. When the energy of the primary waves arrives, the switch 72 is displaced by energization of relay 65 to open the circuit between condenser 78 and source 74 and to couple condenser 78 to the grid of valve 20 to apply a strong negative bias, whereby the degree of amplification is reduced as hereinbefore explained. The gradual discharge of condenser 78 through resistance 80 then functions to compensate for attenuation of later received waves. It will be noted that in this arrangement as in that shown in Figure 3a, the condenser 78 is fully charged at the desired potential before the arrival of the primary waves.

It will be appreciated that the instant invention is directed essentially to a system for automatically controlling the sensitivity of seismic apparatus and that two principal functions are effected. The first is the reduction of amplitude of the earlier received waves in response to the arrival of the signal in the detector or seismometer. The second is the increase in sensitivity of the system over a period of time during the reception of the later or reflected waves to compensate for attenuation thereof. Either of these functions is highly desirable, and when both are effected, a record in which the trace is maintained within usable limits is secured.

It will be quite obvious to those skilled in the art that the details of the circuits described herein may be widely varied without departing from the essential features of the invention, and that the specific embodiments illustrated and described are presented merely by way of example.

Having thus described the invention, what is claimed as new and desired to be secured by Letters Patent is:

1. An amplifier for amplifying a train of waves extending over a period of several seconds and in which an earlier arriving part of the train has a general amplitude level several times greater than a later arriving part and in which the level of the later arriving part of the train gradually decreases, comprising in combination, an amplifier including a variable gain thermionic valve, means to apply said wave train to said amplifier, means to deliver the amplified train, and means to automatically reduce the gain of said valve during reception of said earlier arriving part of the train and thereafter to automatically return the gain to normal at a gradual rate spread over the greater portion of the period of reception of the later arriving part of the train, whereby compensation is had for the normal decrease in amplitude of such later arriving part of the train, said last named means including a source of bias voltage other than said waves, a condenser, connections between said source and said condenser and between said condenser and a grid of said valve, and devices operable in response to variation in amplitude of said waves for controlling said connections to connect said condenser to said grid and to disconnect said source from said condenser on the reception of said earlier arriving part of the train.

2. An amplifier for amplifying a train of waves extending over a period of several seconds and in which an earlier arriving part of the train has a general amplitude level several times greater than the later arriving part and in which the level of the later arriving part of the train gradually decreases, comprising in combination, an amplifier including a variable gain thermionic valve, means to apply said wave train to said amplifier, means to deliver the amplified train, and means to automatically reduce the gain of said valve during reception of said earlier arriving part of the train and thereafter to automatically return the gain to normal at a gradual rate spread over the greater portion of the period of reception of the later arriving part of the train, whereby compensation is had for the normal decrease in amplitude of such later arriving part of the train, said last named means including a source of bias voltage other than said waves, a condenser charged from said source, and connections between said condenser and a grid of said valve, and devices operable in response to variation in amplitude of said waves for controlling said connections to connect said condenser to said grid on the reception of said earlier arriving part of the train.

OLIVE S. PETTY.